United States Patent
S et al.

(10) Patent No.: US 7,777,704 B2
(45) Date of Patent: Aug. 17, 2010

(54) SYSTEM AND METHOD FOR CONTROLLING A MULTI-STRING LIGHT EMITTING DIODE BACKLIGHTING SYSTEM FOR AN ELECTRONIC DISPLAY

(75) Inventors: Dilip S, Saratoga, CA (US); Gurjit Thandi, San Jose, CA (US); Hendrik Santo, San Jose, CA (US); Kien Vi, Palo Alto, CA (US)

(73) Assignee: mSilica, Incorporated, Santa Clara, CA (US)

( * ) Notice: Subject to any disclaimer, the term of this patent is extended or adjusted under 35 U.S.C. 154(b) by 704 days.

(21) Appl. No.: 11/652,736

(22) Filed: Jan. 12, 2007

(65) Prior Publication Data

US 2008/0170012 A1    Jul. 17, 2008

(51) Int. Cl.
 G09G 3/32    (2006.01)
(52) U.S. Cl. .................. 345/82; 345/102; 315/291; 315/307; 315/308; 315/311; 315/312; 315/316; 315/320
(58) Field of Classification Search ............... 345/82, 345/102; 315/291, 307–320
See application file for complete search history.

(56) References Cited

U.S. PATENT DOCUMENTS

| | | | | |
|---|---|---|---|---|
| 6,107,985 A | * | 8/2000 | Walukas et al. | 345/102 |
| 7,471,287 B2 | * | 12/2008 | Chen et al. | 345/212 |
| 2003/0043107 A1 | | 3/2003 | Ruby et al. | |
| 2004/0041526 A1 | | 3/2004 | Vollrath | |
| 2005/0174475 A1 | * | 8/2005 | Yoshida | 348/370 |
| 2006/0001641 A1 | * | 1/2006 | Degwekar et al. | 345/102 |

OTHER PUBLICATIONS

Int'l Search Report, PCT/US08/50911, mailed Jul. 7, 2008.

* cited by examiner

*Primary Examiner*—Richard Hjerpe
*Assistant Examiner*—Saifeldin Elnafia
(74) *Attorney, Agent, or Firm*—Turocy & Watson, LLP; Vinay Joshi

(57) ABSTRACT

The present invention relates to displays that use LED strings for backlighting. A lead string is provided with continuous drive voltage and the non-lead strings are provided with pulsed drive pulses. The string having the highest forward voltage is selected as the lead string. Feedback information indicative of the currents flowing through the non-lead strings is used to determine the duty cycles of the voltage pulses provided to drive the non-lead strings. The non-lead strings are controlled using pulsed drive voltages to minimize power dissipation in the circuit.

24 Claims, 6 Drawing Sheets

SYSTEM AND METHOD FOR CONTROLLING A MULTI-STRING LIGHT EMITTING DIODE BACKLIGHTING SYSTEM FOR AN ELECTRONIC DISPLAY

FIELD OF INVENTION

The present invention relates to electronic display technology, and particularly to controlling the light emitting diode (LED) strings of the backlights of electronic displays.

BACKGROUND OF THE INVENTION

Backlights are used to illuminate thick and thin film displays including liquid crystal displays (LCDs). LCDs with backlights are used in small displays for cell phones and personal digital assistants (PDA), as well as in large displays for computer monitors and televisions. Typically, the light source for the backlight includes one or more cold cathode fluorescent lamps (CCFLs). The light source for the backlight can also be an incandescent light bulb, an electroluminescent panel (ELP), or one or more hot cathode fluorescent lamps (HCFLs).

The display industry is enthusiastically perusing the use of LEDs as the light source in the backlight technology because CCFLs have many shortcomings: they do not easily ignite in cold temperatures, require adequate idle time to ignite, and require delicate handling. LEDs generally have a higher ratio of light generated to power consumed than the other backlight sources. So, displays with LED backlights consume less power than other displays. LED backlighting has traditionally been used in small, inexpensive LCD panels. However, LED backlighting is becoming more common in large displays such as those used for computers and televisions. In large displays, multiple LEDs are required to provide adequate backlight for the LCD display.

Circuits for driving multiple LEDs in large displays are typically arranged with LEDs distributed in multiple strings. FIG. 1 shows an exemplary flat panel display 10 with a backlighting system having three independent strings of LEDs 1, 2 and 3. The first string of LEDs 1 includes seven LEDs 4, 5, 6, 7, 8, 9 and 11 discretely scattered across the display 10 and connected in series. One of ordinary skill in the art will appreciate that a LED string may have any number of LEDs ranging from one to more than twenty. The first string 1 is controlled by the drive circuit 12. The second string 2 is controlled by the drive circuit 13 and the third string 3 is controlled by the drive circuit 14. The LEDs of the LED strings 1, 2 and 3 can be connected in series by wires, traces or other connecting elements.

FIG. 2 shows another exemplary flat panel display 20 with a backlighting system having three independent strings of LEDs 21, 22 and 23. In this embodiment, the strings 21, 22 and 23 are arranged in a vertical fashion. The three strings 21, 22 and 23 are parallel to each other. The first string 21 includes 7 LEDs 24, 25, 26, 27, 28, 29 and 31 connected in series, and is controlled by the drive circuit 32. The second string 22 is controlled by the drive circuit 33 and the third string 23 is controlled by the drive circuit 34. One of ordinary skill in the art will appreciate that the LED strings can also be arranged in a horizontal fashion or in another configuration.

A critical feature for displays is the ability to control the brightness. The brightness must be sufficient, stable, and adjustable. Sufficient brightness is critical so that users can comfortably perceive the image on the display. Stability is critical because users do not want the screen to deviate from the set brightness. Adjustability is critical because users want to adjust the screen brightness to suit their preferences in given situations. In LCDs, the brightness is controlled by changing the intensity of the backlight. The intensity of the light, or luminosity, is a function of the current flowing through the light source. Therefore, the current in the backlight strings must be sufficient, stable, and adjustable. FIG. 3 shows a representative plot of luminous intensity as a function of current for an LED.

A challenge in generating sufficient light from multi-string circuits is balancing the current in each string. Strings may include different numbers of LEDs and may include different types of LEDs. Ideally, LEDs of the same type would have the same electrical properties. But in reality, light sources of the same type have different electrical properties. For example, two LEDs of the same type may have the same manufacturer specification for minimum LED voltage, i.e., the voltage difference across the LED above which current flows in the LED. In reality, the actual LED voltage for each LED can be different. The LED voltage of the LED string is equal to the sum of the individual voltages of the LEDs in the string connected in series. Therefore, the LED voltages of LED strings can vary significantly from each other depending on the number and types of LEDs in the strings. Different LED voltages also mean different voltage drops across each string and different currents flowing through each string. Also, a string may contain one or more burnt out or damaged LEDs, causing short circuit conditions. LED temperature and the LED string current can affect the actual voltage across the LED. All these factors influence the amount of current that is required to flow through the string to generate a desired luminosity.

FIG. 4 illustrates an exemplary technique of implementing LED strings in a display 40. A power supply 41 is shown connected to strings 42, 43 and 44. The strings 42, 43 and 44 are connected to the ground. The power supply 41 supplies input voltage Vin to the strings 42, 43 and 44. String 42 includes seven LEDs 45, 46, 47, 48, 49, 51 and 52. If the voltage drops across the LED strings 42, 43 and 44 are different from each other, the current in each string 42, 43 and 44 will be different for a given input voltage Vin. The challenge in designing multi-string circuits is to ensure that all the light sources are illuminated and that the current in each string is sufficient to bring the light source to the appropriate intensity.

One method for assuring sufficient current in each string 42, 43 and 44 is to ensure that the input voltage Vin is sufficiently high to induce the target current in the LED string having the highest voltage drop 42, 43 or 44. This method assumes that the voltage drop in each string 42, 43 and 44 is such that it does not cause the Vin to exceed the LED manufactures' specifications. Users of this method typically increase this input voltage Vin further to assure sufficient current flows through the strings 42, 43 and 44 in case of any discrepancies in the manufactures' specifications. However, as a result, each string 42, 43 or 44 generates more than the needed current. That is inefficient because it generates unneeded light and dissipates more current. This method might require the usage of guard banding and other techniques to prevent the damage that may result to the circuit components from the dissipation of excess power.

FIG. 5 illustrates a prior art technique for balancing LED strings in the display 50. A power supply 51 is shown coupled to one of the ends of the LED strings 52, 53 and 54. The power supply 51 provides driving voltage $V_{OUT}$ to the LED strings 52, 53 and 54. The other ends of the LED strings 52, 53 and 54 are connected to the drains of the field effect transistors (FETs) FET1, FET2 and FET3. The sources of the field effect transistors FET1, FET2 and FET3 are coupled to the ground by way of the resistors R1, R2 and R3 respectively. The currents flowing through the LED strings 52, 53 and 54 are sensed by the resistors R1, R2 and R3 respectively, and the sensed voltages are provided as feedback inputs to comparators, for example, error amplifiers EA1, EA2 and EA3 respectively.

The other inputs to the error amplifiers EA1, EA2 and EA3 include reference voltage sources 55, 56 and 57 for providing reference voltages $V_{REF1}$, $V_{REF2}$ and $V_{REF3}$. The outputs of the error amplifiers EA1, EA2 and EA3 are coupled to the gates of the transistors FET1, FET2 and FET3 to control the current flow through the LED strings 52, 53 and 54. One of ordinary skill in the art will appreciate that the voltages applied to the gates of the transistors FET1, FET2 and FET3 control the on and off times of the transistors FET1, FET2 and FET3, and also control the maximum rate of current flow through the transistors FET1, FET2 and FET3.

One of ordinary skill in the art will also appreciate that the reference voltages $V_{REF1}$, $V_{REF2}$ and $V_{REF3}$ represent the desired current flows through the LED strings 52, 53 and 54 respectively. The error amplifiers EA1, EA2 and EA3 compare the reference voltages $V_{REF1}$, $V_{REF2}$ and $V_{REF3}$ respectively with the sensed feedback currents for the strings 52, 53 and 54 respectively and provide compensating control voltages to the gates of the transistors FET1, FET2 and FET3 respectively, to ensure that that the desired currents flow through the LED strings 52, 53 and 54.

The display 50 of FIG. 5 has many drawbacks including that it requires extra comparison circuitry and requires that the same driving voltage $V_{OUT}$ is continuously provided to all the LED strings 52, 53 and 54, regardless of the current flow requirement of a particular string 52, 53 or 54. The present invention provides innovative systems and methods for high efficiency automatic power balancing of LED strings used for backlighting electronic displays.

SUMMARY OF THE INVENTION

The techniques of the present invention relate to efficiently controlling the current in multi-string LED circuits to make the current sufficient, stable, and adjustable. In the present invention, the common input voltage to the strings is increased until current flows in all LED strings. The last string to allow the current to flow, i.e. the string having the highest forward voltage or highest LED string voltage drop, is selected as the lead string. The lead string is maintained in a continuous, or analog, current mode. The other strings of the circuit, referred to as the non-lead strings, are then switched to a discrete current mode, or pulse width modulation (PWM) mode, to ensure that the input voltage is selectively provided to allow only predetermined currents to flow through those strings. The peak currents of the non-lead strings, i.e., the currents flowing through the non-lead strings when maximum current flow is allowed in those strings, are used to determine the PWM duty cycles for those strings.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
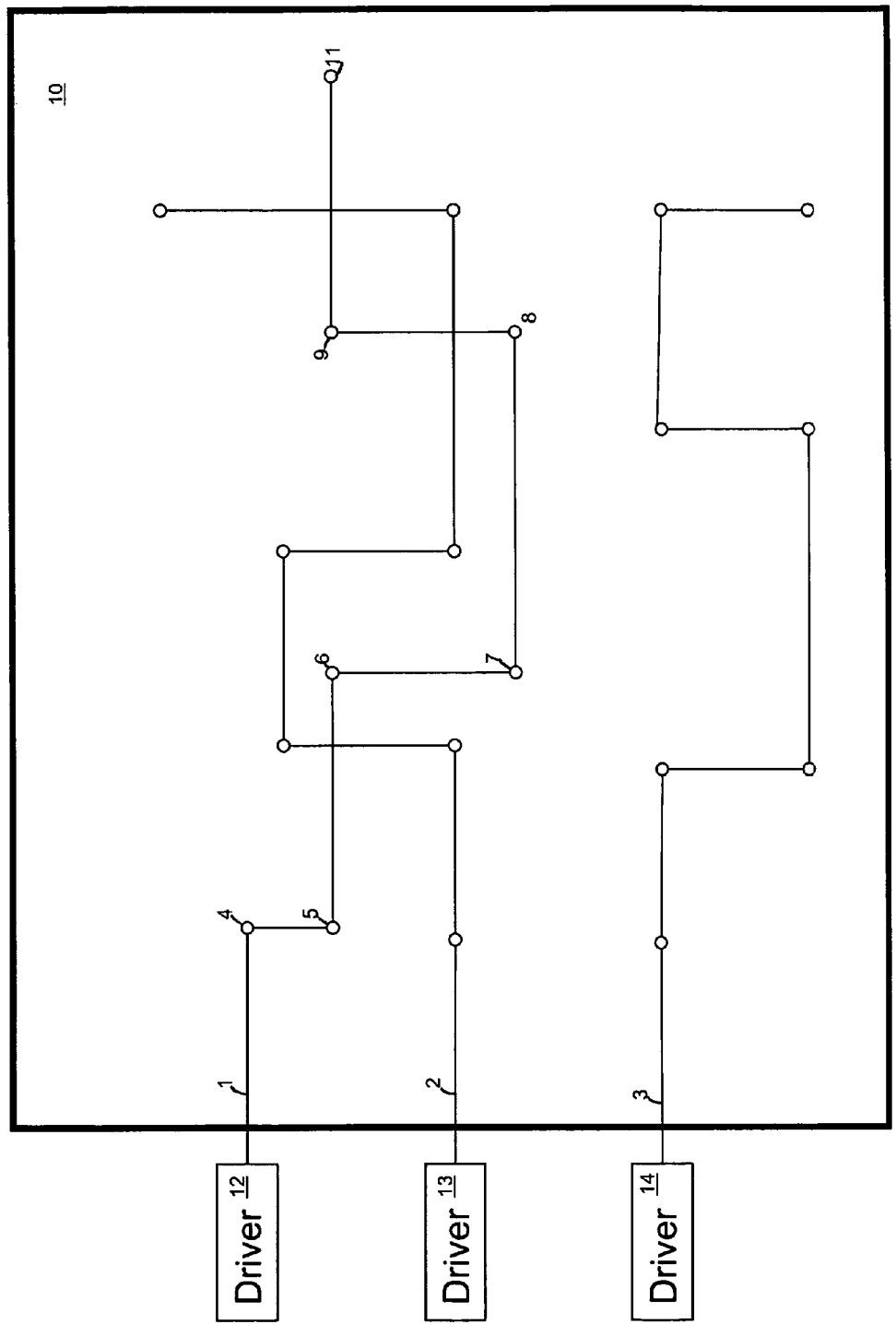
FIG. 1 illustrates an exemplary display implementing LED strings.
Figure 2:
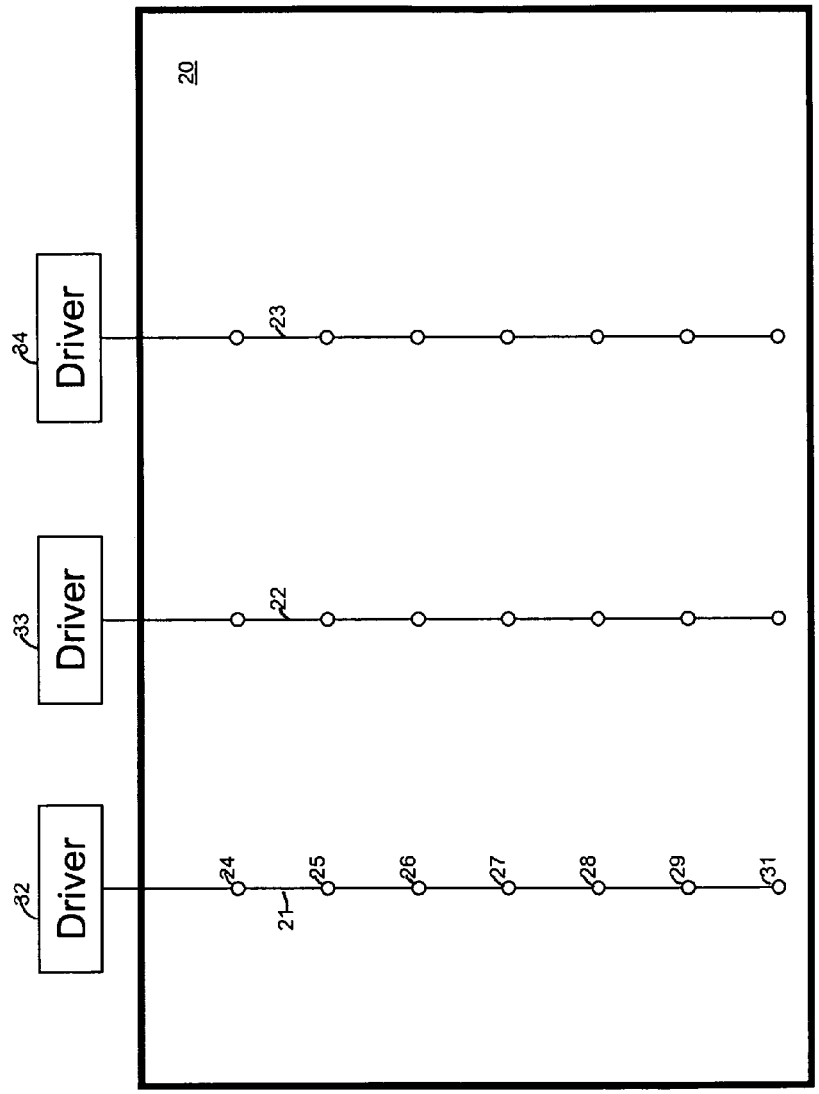
FIG. 2 illustrates another exemplary display implementing LED strings.
Figure 3:
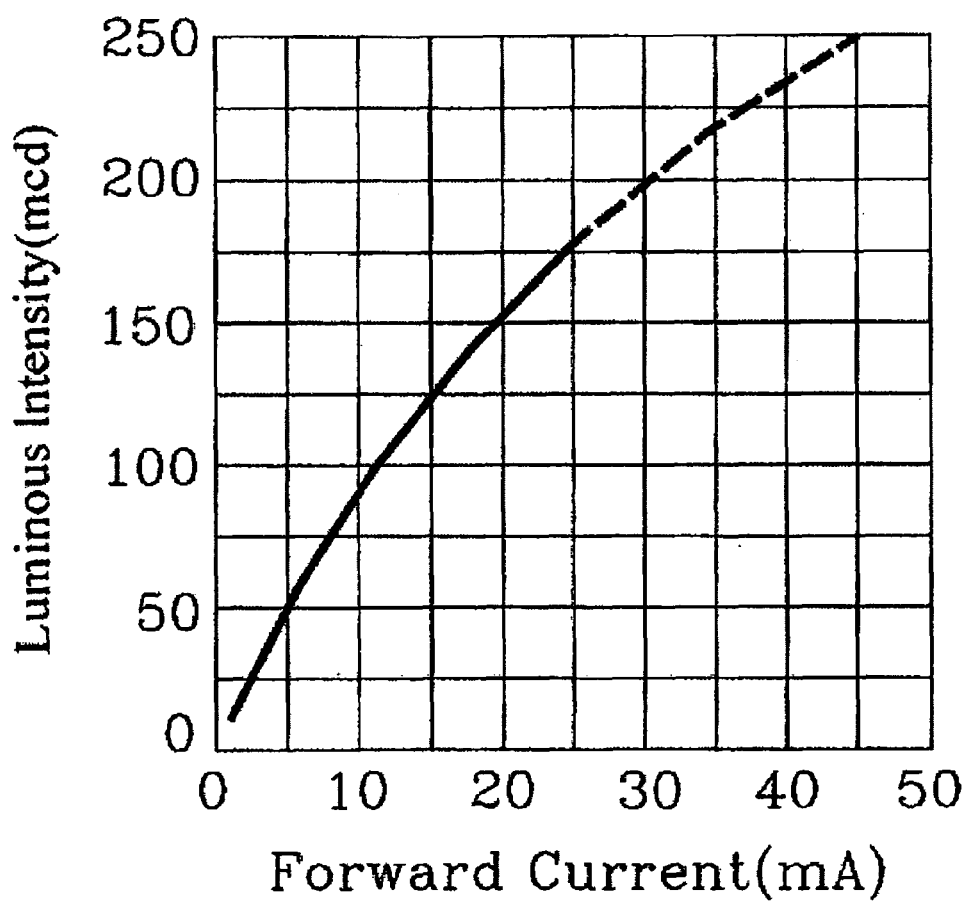
FIG. 3 illustrates a graph showing relationship between current and luminous intensity in an LED.
Figure 4:
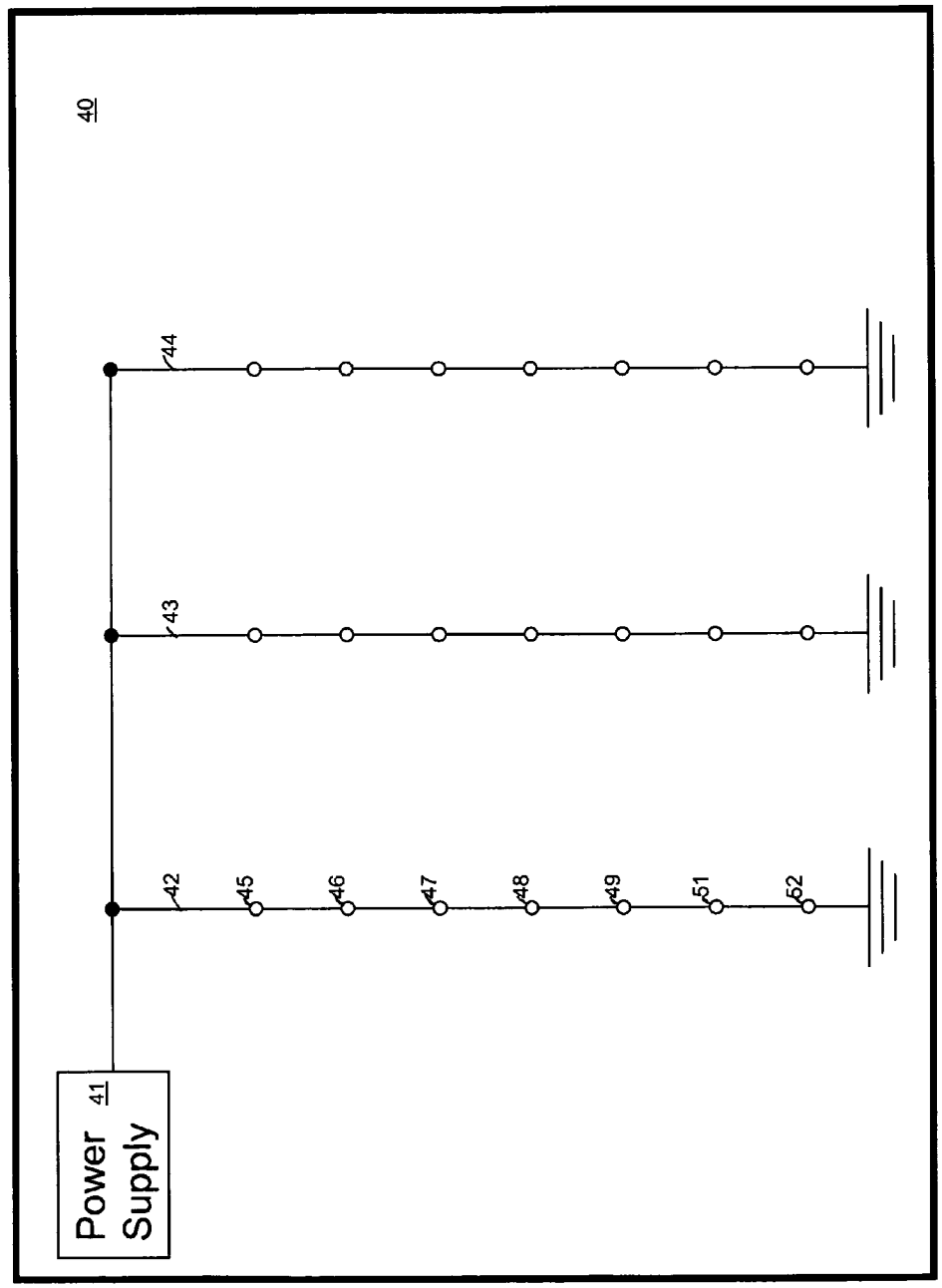
FIG. 4 illustrates a prior art technique for generating currents through LED strings.
Figure 5:
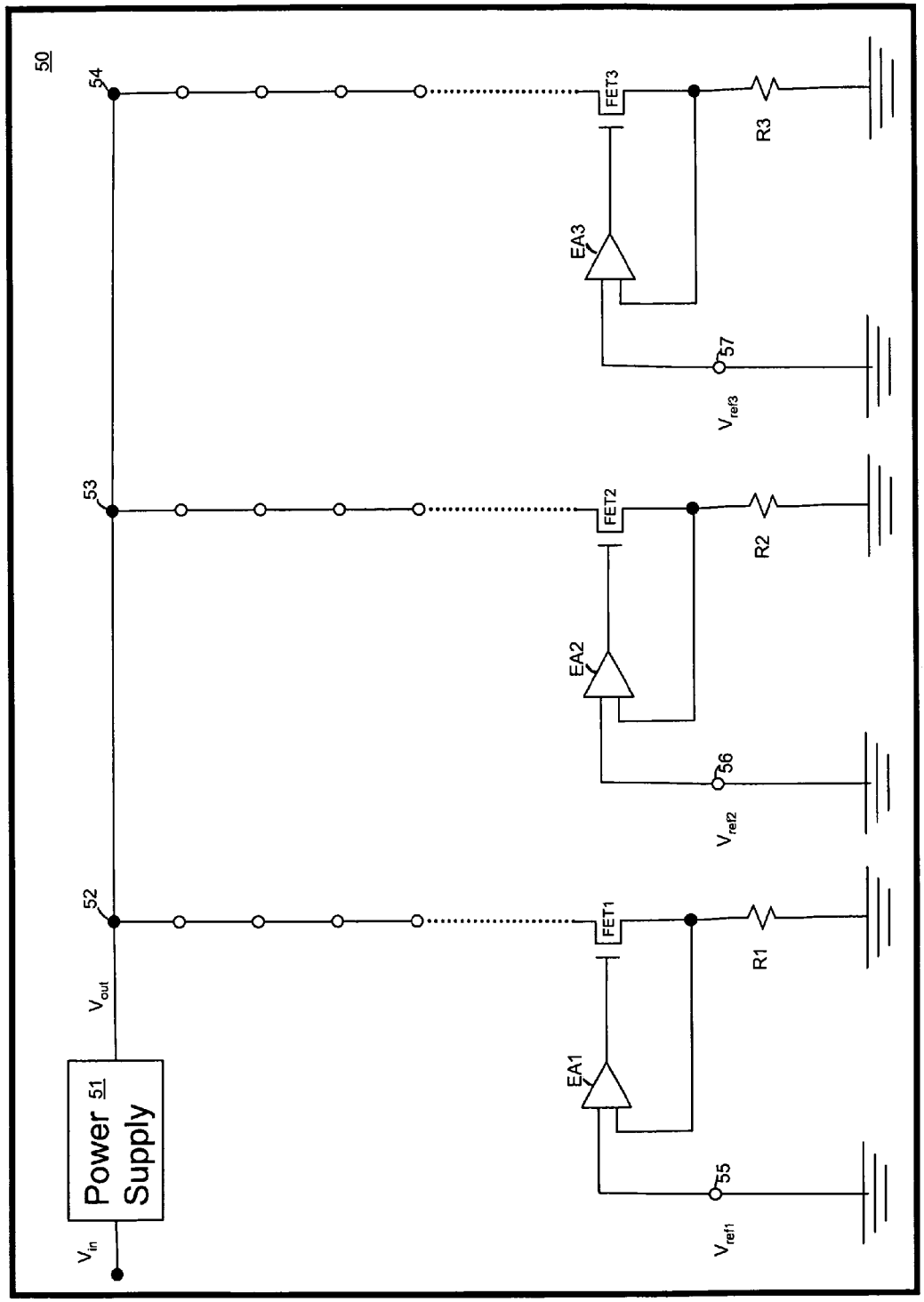
FIG. 5 illustrates a prior art technique for balancing LED strings.
Figure 6:
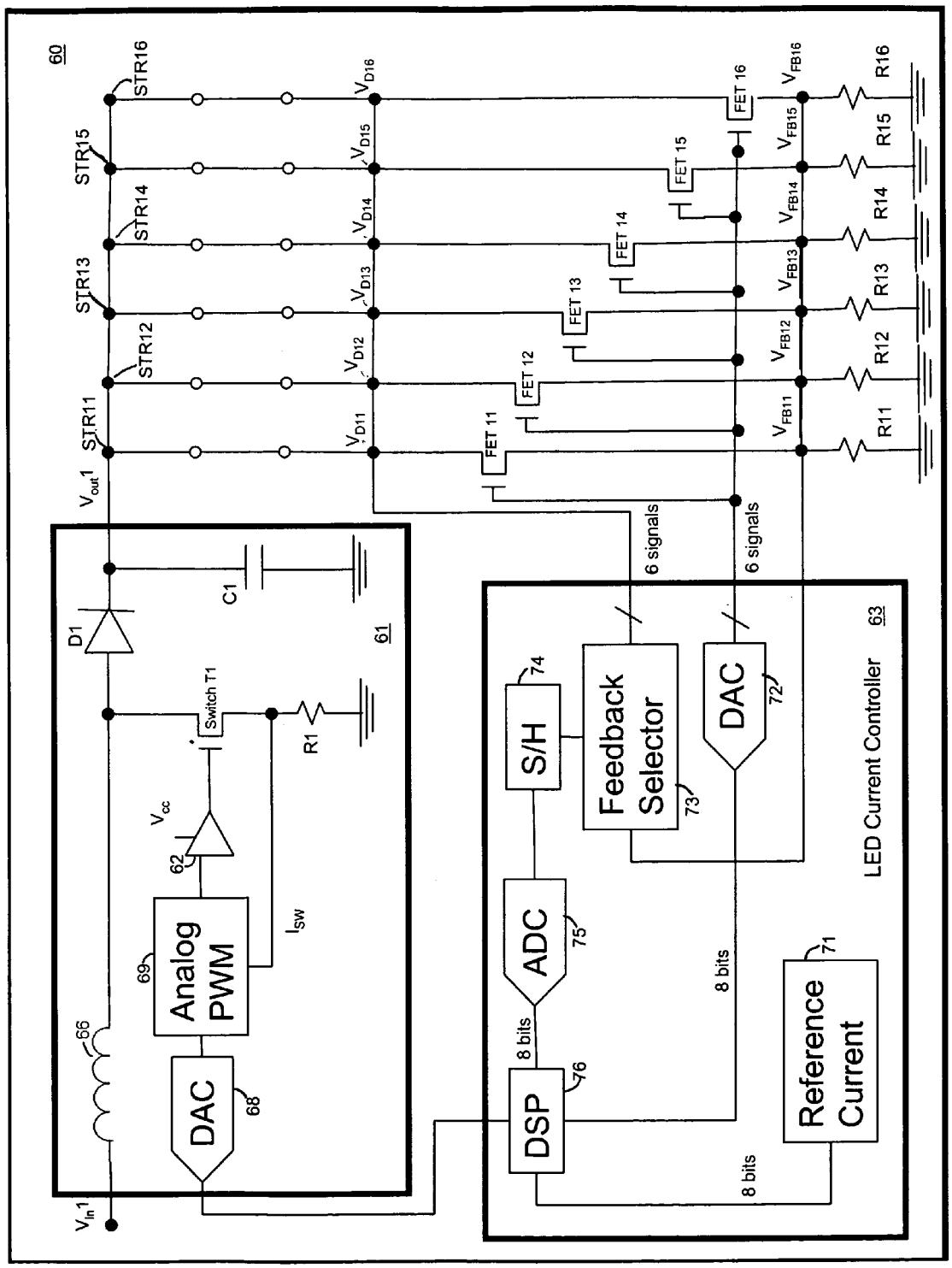
FIG. 6 illustrates an exemplary embodiment of the multi-string backlight circuit of the present invention.

The present invention relates to power conversion in a multi-string driver circuit for light emitting elements. FIG. 6 shows an exemplary display 60 including the multi-string driver circuit of the present invention for illuminating six strings STR11, STR12, STR13, STR14, STR15 and STR16 of light emitting elements. The strings STR11-STR16 are coupled at one node to the voltage source 61. The voltage source 61 provides a driving voltage $V_{OUT1}$ to the strings STR11-STR16. In one embodiment, a boost topology circuit is used in the voltage source 61 to provide driving voltage $V_{OUT1}$ to the six strings STR11-STR16. One of ordinary skill in the art will appreciate that the inductor 66, the diode D1, the transistor switch T1, the resistor R1 and the capacitor C1 are components of a typical boost topology circuit. The digital to analog converter (DAC) 68, the analog pulse width modulation (PWM) block 69 and the switch driver 62 are used by the LED Current Controller to selectively turn on and turn off T1, and therefore control level of $V_{OUT1}$. The DAC 68, the PWM block 69 and the switch driver 62 can be inside the LED Current Controller 63 or outside the LED Current Controller 63.

The DAC 68 receives digital data, for example eight-bit digital data, from the digital signal processor (DSP) 76 of the LED current controller 63. That digital data is indicative of the desired $V_{OUT1}$ voltage. The DAC 68 converts the digital data into an analog signal and provides it as an input to the analog PWM block 69. The analog PWM block 69 is coupled to the gate of the transistor T1 by way of the driver 62. The analog PWM block 69 also receives the sensed voltage corresponding to the current flowing out of the source of T1 into R1 as an input. The PWM block 69 provides voltage pulses of selected pulse widths to the gate of T1 by way of the driver 62 to adjust the $V_{OUT1}$ voltage, based on the digital data provided by the DSP 76 and the feedback current sensed at R1. The analog PWM block 69 uses the sensed voltage at R1 as a feedback signal to adjust the pulse widths of the voltage pulses to cause T1 to selectively conduct as desired. By selectively causing the transistor T1 to conduct and not conduct by controlling the pulse width of the driving pulses provided to the Transistor T1, the power supply 61 provides the $V_{OUT1}$ voltage desired by the DSP 76. One of ordinary skill in the art will understand that a buck topology circuit or another circuit topology can be used instead of the boost topology circuit 62. One of ordinary skill in the art will also understand that the voltage source 61 can be coupled to the strings STR11-STR16 by way of a step up or step down power converter.

The other ends of the strings STR11-STR16 are coupled to six field effect transistors (FETs) FET11, FET12, FET13, FET14, FET15 and FET16 respectively. One of ordinary skill in the art will appreciate that the six FETs FET11-FET16 are used as current sinks. The sources of the six FETs FET11-FET16 are coupled to the ground by way of six resistors R11, R12, R13, R14, R15 and R16 respectively. The sources of the six FETs FET11-FET16 are also coupled to the Feedback Selector block 73 of the LED Current Controller 63 by way of the six feedback paths VFB11, VFB12, VFB13, VFEB14, VFB15 and VFB16 respectively. The gates of the six FETs FET11-FET16 are coupled to the DAC 72 of the LED Current Controller 63. The gates of the six FETs FET11-FET16 are also coupled to the Feedback Selector block 73. The Feedback Selector block 73 detects voltages at the drains and the sources of the FETs FET11-FET16. The DSP 76 and the Feedback Selector block 73 use those detected voltages as feedback signals for controlling the operations of the strings STR11-STR16 by way of the power source 61 and the DAC 72.

The Feedback Selector block 73 is coupled to the Sample and Hold (S&H) block 74. The S&H block 74 is coupled to the analog to digital converter (ADC) 75. The ADC 75 is coupled to the DSP 76. The DSP 76 is coupled to the DAC 72, the reference current block 71 and the DAC 68. All components of the LED Current Controller 63 can be implemented in hardware, software or firmware. An explanation of the interactivity between the various components of the display 60 follows.

The Feedback Selector block 73 receives feedback signals from the strings STR11-STR16 indicative of the current flowing through the strings STR11-STR16. One of ordinary skill in the art will appreciate that the light emitting elements may be any of a number of devices including LEDs. The power supply 61 is one of any number of devices that can provide an adjustable driving voltage $V_{OUT1}$ to the strings STR11-STR16.

The present invention achieves stable and fast feedback control of the driving voltage $V_{OUT1}$ and minimizes power consumption in the circuit of the display 60. A technique of the present invention that can be implemented using the display 60 is as follows. At initialization, the voltage source 61, which can be a DC to DC converter, ramps up the $V_{OUT1}$ until the strings STR11-STR16 reach a predetermined operating state. The predetermined operating state can mean a state in which all strings STR11-STR16 are conducting at least some current. The $V_{OUT1}$ can be ramped up to a preset value, calculated to allow all strings to conduct current. Preferably, during initialization, the DSP 76 of the LED Current Controller 63 provides gate voltages to the FETs FET11-FET16 by way of the DAC 72 to allow maximum currents to flow through the FETs FET11-FET16.

During the ramping-up stage, all the strings STR11-STR16 are driven in a continuous current mode. That means that voltage source 61 continuously provides input voltage to the strings STR11-STR16. Once the last string of the six strings STR11-STR16 begins to conduct current, the ramp up process is stopped and $V_{OUT1}$ level is maintained. One of ordinary skill in the art will appreciate that the DSP 76 can be programmed to maintain the $V_{OUT1}$ level at a level higher than the minimum $V_{OUT1}$ level needed to cause all the strings STR11-STR16 to conduct current, to ensure current flow in case of any changes to the circuit, for example, a burnt LED or changes in the actual LED forward voltage.

The Feedback Selector block 73 detects the feedback signals received from the current-sink FET transistors FET11-FET16. The Feedback Selector block 73 can use the feedback signals received from the drains of the FETs FET11-FET16, or the sources of the FETs FET11-FET16, or both. The Feedback Selector block 73 communicates the values of the analog feedback signals to the DSP 76 by way of the S&H block 74 and the ADC 75. Based on the feedback signal levels, the DSP 76 adjusts the gate drive voltages of the FETs FET11-FET16 by way of the DAC 72, to ensure that each string STR11-STR16 is conducting the same amount of current. By controlling the gate drive voltages of the FETs FET11-FET16, which can include NMOS transistors, the LED Current Controller 63 adjusts the maximum amount of current that can flow through the FETs FET11-FET16.

The string that requires the lowest FET drain voltage is selected as the lead string. The lead string is essentially the string with the most resistance of all the strings STR1-STR6, and therefore has the highest forward voltage $V_F$, and therefore requires the most input voltage $V_{OUT1}$ to operate. Forward voltage $V_F$ is the minimum voltage required to cause the current to flow through the string. The lead string has the lowest drain-source-voltage ($V_{DS}$) across the FET coupled to it.

For example, STR12 can be the lead string. That means that STR2 has the highest forward voltage of all the strings STR11-STR16. In that example, STR12 is supplied $V_{OUT1}$ in a continuous or analog current mode. All the other strings STR11, STR13-STR16 are switched to operate in a pulse width modulation (PWM) state, or a discrete current mode. A discrete current mode is one in which the current is oscillated between a peak and a minimum current. The percentage of the time that the current is at its peak is known as the duty cycle. The PWM state allows for selective voltage supply to and current flow through a string, thereby reducing power dissipation in the non-lead strings STR11, STR13-STR16.

The average current is the quantity of the peak current minus the minimum current times the duty cycle. In discrete current mode, the duty cycle can be decreased to lower the average current. For example, the current can be switched to its peak value for a short time and then switched to its minimum value thereby lowering the average current in a string. In discrete mode, the current can be lowered by intermittently switching to the minimum current setting instead of by dissipation. The time between successive starts for the peak current is known as the period of the discrete mode.

When the period is sufficiently low in a backlight circuit, the human eye does not perceive the variation in the light generated by a discrete mode current. The human eye instead perceives the brightness as that which would be produced by the average current. Because of this, discrete current mode is appropriate for control of backlights for displays. Therefore, backlight circuits controlled in discrete current mode can lower average current with less dissipation than circuits run in continuous mode.

The LED current controller 63 includes a reference current block 71 that can be programmed with information such as the total current that is required to flow through all the strings STR11-STR16 for generating the desired luminosity, or the desired current flow through each string. In one embodiment, the reference current block 71 sets a target setting for the target current that is required to flow through a string STR11-STR16 to meet the desired luminosity goal.

The FETs FET11-FET16 control the switching (on/off) and conducting capabilities of the strings STR11-STR16. In the example in which string STR12 is the lead string and strings STR11 and STR13-STR16 are the PWM strings, the PWM strings STR11, STR13-STR16 can be operated with the maximum current setting allowed by the reference current block 71 and the current sink FETs FET11, FET13-FET16. The PWM duty cycle is intelligently calculated by the DSP 76 based on the current settings of the string STR11, STR13-STR16 and the maximum current allowed in the string STR11, STR13-STR16. The FETs FET11-FET16 are parts of the conduction paths that starts at the top nodes of the strings STR11-STR16 coupled to the input voltage source Vin and ends at the resistors R11-R16 coupled to the ground. The LED Current Controller 63 can interrupt the conduction paths by turning off the FETs FET11-FET16 or complete the conduction paths by turning on the FETs FET11-FET16.

In the example in which string STR12 is the lead string, the DSP 76 intelligently turns on and turns off the FETs FET11, FET13-16 to control the PWM duty cycles, based on the current settings for the strings STR11, STR13-STR16 and the maximum current allowed in the strings STR11, STR13-STR16. A technique for determining the PWM duty cycles for the non-lead strings STR11, STR13-STR16 is to determine the peak currents flowing through the non-lead strings. Peak currents are the feedback currents indicative of the currents that flow through the strings STR11, STR13-STR16 when the FETs FET1, FET13-FET16 allow maximum currents to flow to the ground by way of resistors R11, R12-R16. In other words, peak current flow occurs when the FETs FET11, FET3-FET16 are in maximum conduction states. The Feedback Selector 73 can measure the peak currents periodically, for example, once every clock cycle. In typical operations, such as LCD displays that use LED strings for backlighting, the backlighting system is clocked at rates ranging from 30 hz to 200 khz. Based on the detected peak currents, the DSP 76 can determine the PWM duty cycle for each string. In one embodiment, the DSP 76 can integrate the peak currents over a period of time, or over a few cycles, to determine the required PWM duty cycles. One of ordinary skill in the art will appreciate that the DSP 76 can be programmed to compare either the integrated peak current value or the average peak current value for each non-lead string STR11, STR13-STR16 with a reference value to determine the PWM ratio for each non-lead string STR11, STR13-STR16. In one embodiment, the PWM ratio is two-third. That means that the non-lead strings conduct current for two thirds of the time that the lead string conducts current.

In one embodiment of the present invention, the Feedback Selector block 73 selects the lead string every one second. The Feedback Selector block 73 can be a part of the LED Current Controller 63 or can be a separate component. The feedback Selector block 73 can also use the detected drain and source voltages of the LED strings STR11-STR16 to determine the lead string. It is important to periodically select the lead string. LED strings are typically imbalanced because for various reasons. For example, the LED strings may have different numbers of LEDs or may use different colors or types of LEDs. Also, the dynamics of the strings change during operation, for example, the resistance of the LEDs may change during operation as a result of ambient heat or because a LED may burn out. As a result, a non-lead string may become the lead string during circuit operation and the lead string may change from time to time.

This invention efficiently solves the problems of current sufficiency, stability, and control. In one embodiment, this invention is efficient if all strings but the lead string are operated in a PWM mode. In another embodiment, some strings operate in continuous voltage mode and some strings operate on the PWM mode. This invention is advantageous because the entire driver circuit can be implemented in a single integrated circuit chip. In an alternate embodiment, the invention is carried out using implementations such as purely analog lead string selector and PWM generators. One of ordinary skill in the art will appreciate that the techniques, structures and methods of the present invention above are exemplary. The present inventions can be implemented in various embodiments without deviating from the scope of the invention.

The invention claimed is:

1. A method for controlling a display, the method comprising:
    selectively changing a measurable output parameter for a plurality of light emitting diode strings by selectively varying an input parameter for the plurality of light emitting diode strings;
    measuring the output parameter for each string of the plurality of light emitting diode strings;
    associating a value with the output parameter;
    comparing the associated value with a threshold value;
    stopping varying the input parameter when the associated value of each string of the plurality of light emitting diode strings meets the threshold value; and
    selecting a last string which associated value meets the threshold value as a lead string.

2. The method of claim 1, wherein the input parameter includes a voltage.

3. The method of claim 1, wherein varying the input parameter includes ramping up a voltage signal.

4. The method of claim 1, wherein the output parameter includes a current flowing through a string of the plurality of light emitting diode strings.

5. The method of claim 1, wherein the threshold value is indicative of current flowing through a string of the plurality of light emitting diode strings.

6. The method of claim 1, further comprising:
    determining a desired associated value for the output parameter for another string different from the lead string; and
    selectively providing the input parameter for the another string.

7. The method of claim 6, wherein the determining the desired associated value for the output parameter for the another string is based on the current flowing through the another string.

8. The method of claim 7, wherein the determining the desired associated value for the output parameter for the another string is based on an integrated value of the current flowing through the another string over a period of time.

9. The method of claim 6, wherein the desired associated value for the output parameter for the another string is a portion of the associated value for the output parameter for the lead string.

10. The method of claim 9, wherein the determining the desired associated value for the output parameter for the another string comprises using a ratio value to determine the portion of the associated value for the output parameter for the lead string.

11. The method of claim 6, wherein the selectively providing the input parameter for the another string is performed by using a pulse width modulation technique.

12. A display comprising:
    a plurality of light emitting diodes strings;
    an input source for providing an input parameter to the plurality of light emitting diode strings;
    a first circuit for varying the input parameter;
    a feedback circuit for measuring an output parameter of the plurality of light emitting diode strings and associating values to measurements;
    a comparator circuit for comparing the associated values with a threshold value;
    the first circuit for stopping varying the input parameter when the associated value of each string of the plurality of light emitting diode strings meets the threshold value; and a selection circuit for selecting a last string whose associated value meets the threshold value as the lead string.

13. The display of claim 12, wherein the input parameter includes a voltage.

14. The display of claim 12, wherein varying the input parameter includes ramping up a voltage signal.

15. The display of claim 12, wherein the output parameter includes a current flowing through a string of the plurality of light emitting diode strings.

16. The display of claim 12, wherein the threshold value corresponds to a maximum current desired to flow through any string of the plurality of light emitting diode strings.

17. The display of claim 12, further comprising:
a second circuit for determining a desired associated value for an output parameter for an another string different from the lead string; and
a third circuit for selectively providing the input parameter for the another string.

18. The display of claim 17, wherein the determining the desired associated value for the output parameter for the another string is based on the current flowing through the another string.

19. The display of claim 17, wherein the determining the desired associated value for the output parameter for the another string is based on an integrated value of the current flowing through the another string over a period of time.

20. The display of claim 17, wherein the desired associated value for the output parameter for the another string is a portion of the associated value for the output parameter for the lead string.

21. The display of claim 20, wherein the determining the desired associated value for the output parameter for the another string comprises using a ratio value to determine the portion of the associated value for the output parameter for the lead string.

22. The display of claim 17, wherein the selectively providing the input parameter for the another string is performed by using a pulse width modulation technique.

23. The display of claim 12, wherein the display is a flat panel display.

24. A backlighting system for a flat panel display, the backlight system comprising:
a plurality of light emitting diodes strings;
a voltage source for supplying a progressively increasing input voltage signal to the plurality of light emitting diode strings;
a feedback circuit for sensing currents flowing through the plurality of light emitting diode strings and associating values to the sensed currents;
a comparator circuit for comparing the associated values with a threshold value;
the voltage source for maintaining a level of the input voltage signal after an associated value of each string of the plurality of light emitting diode strings meets the threshold value;
a selection circuit for selecting a last string whose associated value meets the threshold value as the lead string; and
a driver circuit for selectively driving a non-lead string of the plurality of light emitting diode strings based on a desired current flow through the non-lead string.

* * * * *